United States Patent [19]

Ewing

[11] 4,406,561
[45] Sep. 27, 1983

[54] SUCKER ROD ASSEMBLY
[75] Inventor: Peter D. Ewing, Milford, Mich.
[73] Assignee: NSS Industries, Plymouth, Mich.
[21] Appl. No.: 298,565
[22] Filed: Sep. 2, 1981
[51] Int. Cl.³ .......................... B25G 3/00; F16B 7/18; F16D 1/00; F16L 15/00
[52] U.S. Cl. .................................. 403/343; 403/284; 403/361
[58] Field of Search ............... 403/343, 284, 285, 274, 403/305, 306, 307, 180, 361; 52/726; 29/172.3

[56] References Cited
U.S. PATENT DOCUMENTS

| | | | |
|---|---|---|---|
| 1,326,259 | 12/1919 | Gunn et al. | 403/343 X |
| 2,009,090 | 7/1935 | Little | 403/284 X |
| 2,251,031 | 7/1941 | Bozeman | 403/299 X |
| 3,489,445 | 1/1970 | Kammerer | 403/343 |

Primary Examiner—Wayne L. Shedd
Attorney, Agent, or Firm—Reising, Ethington, Barnard, Perry & Milton

[57] ABSTRACT

A sucker rod assembly is disclosed for use in oil well pumping apparatus. The assembly comprises a rod with roll-formed threads on the end thereof and a rod-end fitting with a threaded socket for receiving the threaded rod. An unthreaded portion on the outer end of the socket is extruded into surface engagement with the unthreaded surface of the rod to seal and mechanically interlock the rod and fitting.

2 Claims, 3 Drawing Figures

SUCKER ROD ASSEMBLY

FIELD OF THE INVENTION

This invention relates to oil well pumping apparatus and more particularly, it relates to an improved sucker rod assembly.

BACKGROUND OF THE INVENTION

In oil well pumps, the walking beam at the well head is connected by a sucker rod to the pump at the bottom of the well. The sucker rod is usually of great length, often in excess of 10,000 feet and must be of high tensile strength to support even its own weight. Furthermore, the rod is immersed in the crude oil of the well which is highly corrosive. The rod for a well is made up of many individual rod-lengths which are joined end-to-end, each rod-length being about twenty-five feet long. The joint between the rod-lengths is typically in the form of a threaded fitting.

One widely used structure of a rod-length is commonly known as a "three-piece rod." In this structure, the rod is threaded at both ends and a rod-end fitting is threadedly engaged with each end of the rod to form a three-piece assembly. The free end of the rod-end fitting is adapted for connection to another rod-end fitting. One form of three-piece rod assembly uses, on each end of the rod, a fitting which has a threaded male pin on the free end, such fitting being known as the "pin end." With this, the three-piece rods are joined to each other by a conventional threaded coupling which is screwed onto adjoining pin ends. In another form of three-piece rod, one end of the rod is fitted with a pin end and the other end has a fitting with a threaded socket at its free end, the latter being called a "box-end." With this, the rods are joined together by screwing the pin end of one into the box end of the other.

In the prior art, sucker rods, especially the three-piece rods, experience breakage too frequently in the region of the threaded connectors. In use, the rod is subjected to extremely high tensile stress, and also to bending stress due to changes in direction of the well casing. In particular, stress concentration tends to occur in the vicinity of the juncture of the threaded and unthreaded portion of the rod. Such breakage leads to significant amounts of down-time of the pumping apparatus while the rod is removed from the well shaft and replaced.

A general object of this invention is to provide an improved three-piece sucker rod assembly that overcomes the certain disadvantages of the prior art.

SUMMARY OF THE INVENTION

In accordance with this invention, a sucker rod assembly comprises a rod with threaded ends and a rod-end fitting which is threaded onto the rod and additionally has a bead or flange connection to the rod to provide a mechanical interlock. More particularly, the rod-end fitting comprises a unitary steel body including a tool receiving shank and connector portions at each end of the shank. One of the connector portions comprises a threaded socket with a flange that extends beyond the threaded portion of the rod when the rod and the fitting are threadedly engaged. The flange and threaded portion of the socket are disposed in surface engagement with the rod by extruding the connector portion whereby the rod and rod-end are mechanically interlocked in close fitting engagement to reinforce the threaded region of the rod.

A more complete understanding of this invention will be obtained from the detailed description that follows taken with the accompanying drawings.

BEST MODE FOR CARRYING OUT THE INVENTION

Figure 1:
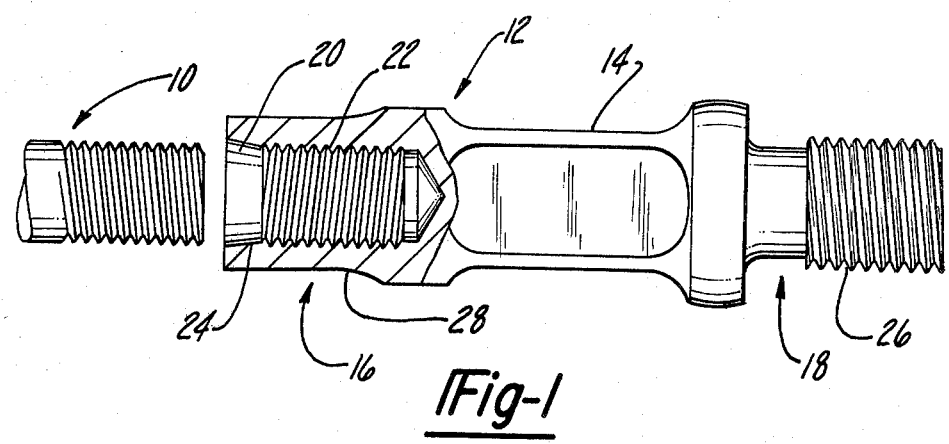
FIG. 1 is an elevation view showing the rod and rod-end fitting before being assembled.

Referring now to the drawings, there is as shown an illustrative embodiment of the invention in a particular three-piece sucker rod assembly for oil wells. It will be appreciated as the description proceeds that the invention may be used for rods of other configurations and for various applications.

The sucker rod 10 and the rod-end fitting 12 of the inventive assembly are shown in FIG. 1 in spaced relation prior to threaded engagement. The rod 10 and rod-end fitting 12 are manufactured preferably from a medium carbon or alloy steel. Hot rolled steel such as SAE-1536 is an example of a commonly used steel. The end of the rod 10 is threaded by a rollform process. Preferably, the length along the rod which is threaded is approximately equal to the rod diameter. The threads are formed so that the major diameter is greater than the diameter of the rod. The rod may be machined or drawn to final dimension in preparation for threading. Machining is preferred in order to minimize any effect on the physical properties of the metal. In addition, the rod is preferably polished, as by rolling, in order to produce a final product which is free of nicks and scratches which would decrease the corrosion-fatigue resistance of the rod.

The rod-end fitting 12 is a unitary body and is formed to the desired shape by a cold forming operation. It comprises a tool receiving shank 14 with connector portions 16 and 18 at opposite ends of the shank. The first connector portion 16 comprises a cylindrical socket 20 having a threaded portion 22 adjacent the bottom of the socket and an unthreaded portion or flange 24 adjacent the outer end of the socket. The second connector portion 18 comprises a threaded pin 26, and constitutes a pin end. It will be appreciated that the second connector portion 18 could take the form of a box end.

The flange 24 on the socket 20 has an inside diameter which is suitably flared toward the open end and is larger than the threaded end of the rod 10. The outside diameter throughout the length of of the flange is substantially uniform. The outside diameter of the socket 28 is preferably shaped to facilitate engagement of a holding tool when the rod is put into the well. For this purpose, it is provided with a shape which is concave in axial cross-section.

Figure 2:
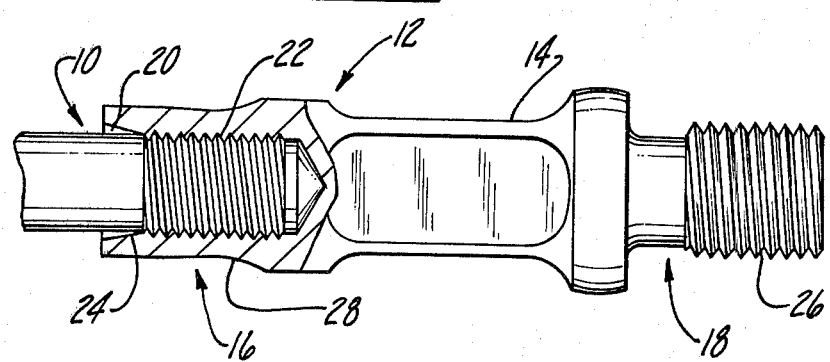
FIG. 2 is an elevation view of the rod and rod-end fitting with the two threadedly engaged.

The rod 10 is threadedly engaged in the socket of the rod-end fitting 12 as illustrated in FIG. 2. The threads on the rod 10 terminate adjacent the inner end of the threaded portion on the flange 24 of the socket 20. If desired an anaerobic cement may be applied to the threads to provide a bond and to enhance the seal to be formed at the threads.

Figure 3:
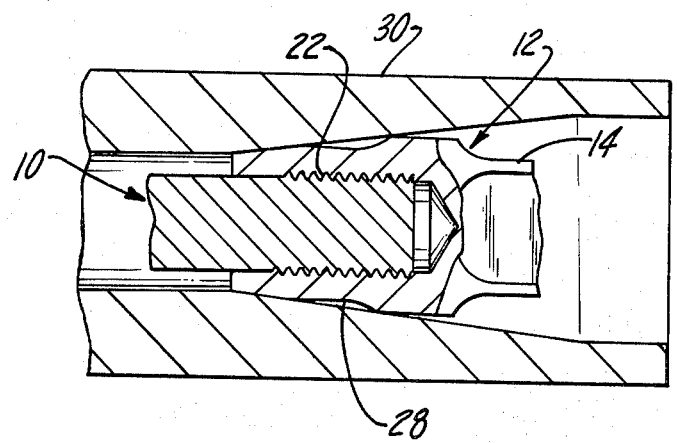
FIG. 3 is an elevation view showing the rod and fitting disposed within an extruding tool.

In order to complete the assembly, the flange 24 is extruded or swaged against the rod 10. This is done with a conventional extruding machine as illustrated in FIG. 3. The extruding tool 30 is preferably constructed such that it will open and the rod assembly may be loaded laterally. The extruding tool exerts a force on the flange 24 to deform it against the rod from the end of the flange throughout the unthreaded portion of the rod 10. This provides a close fitting surface engagement of the rod and the fitting with a positive mechanical interlock. This results in a structural reinforcement in the vicinity of the threads and also provides a seal to exclude corrosive fluid from the threads. Preferably the length of the flange 24 is about one-half inch for rod diameters in the range of five-eighths inch to one inch.

Although the description of this invention has been given with reference to a particular embodiment, it is not to be construed in the limiting sense. Many variations and modifications will now occur to those skilled in the art. For a definition of the invention reference is made to the appended claims.

What is claimed is:

1. A sucker rod assembly comprising:

a rod with threads on one end with an unthreaded adjoining portion of uniform diameter, a rod-end fitting comprising a unitary metal body including a tool receiving shank, a first connector portion at one end of said shank and a second connector portion at the other end of said shank, said first connector portion comprising a cylindrical socket having a threaded portion adjacent the bottom of said socket and an unthreaded portion adjacent the outer end of said socket, said threaded end of said rod being threadedly engaged with the threaded portion of said socket, the threads on the end of said rod having a major diameter greater than the diameter of said adjoining portion of said rod and terminating adjacent the inner end of said unthreaded portion of said socket disposed in uninterrupted surface engagement with the surface of the unthreaded adjoining portion of said rod, whereby said rod and rod-end fitting are mechanically interlocked and the uninterrupted surface engagement seals the threads inside said socket.

2. The invention as defined in claim 1 wherein the second connector portion comprises a threaded pin.

* * * * *